United States Patent [19]

Vance et al.

[11] 4,231,513

[45] Nov. 4, 1980

[54] THERMALLY ACTUATED DIFFUSER

[75] Inventors: Robert L. Vance, Cupertino; Robert W. Noll, Santa Rosa, both of Calif.

[73] Assignee: Acutherm, Inc., Novato, Calif.

[21] Appl. No.: 887,936

[22] Filed: Mar. 17, 1978

[51] Int. Cl.³ .............................................. F24F 7/00
[52] U.S. Cl. ..................................... 236/49; 98/40 B
[58] Field of Search ........... 236/49, 1 C, 13, DIG. 19; 98/40 B, 40 D

[56] References Cited

U.S. PATENT DOCUMENTS

| | | | |
|---|---|---|---|
| 3,166,001 | 1/1965 | Person et al. | 98/40 B |
| 3,732,799 | 5/1973 | Spoormaker | 98/40 B X |
| 3,743,180 | 7/1973 | Perkins et al. | 236/1 C |
| 3,861,588 | 1/1975 | Bata et al. | 236/13 |
| 4,073,433 | 2/1978 | Modes | 236/49 |
| 4,123,001 | 10/1978 | Kolt | 236/49 |

OTHER PUBLICATIONS

Air Conditioning, Heating and Ventilating, Feb. 1963, p. 19, "It's Moving Day for Thermostats."

*Primary Examiner*—Albert J. Makay
*Assistant Examiner*—William E. Tapolcai, Jr.
*Attorney, Agent, or Firm*—Donald C. Feix

[57] ABSTRACT

A diffuser for a conditioned air system for buildings incorporates a self contained and integrated sensor actuator for varying the volume flow of conditioned air through the diffuser in response to changes in room air temperature.

The sensor actuator structure for sensing the room air temperature and for modulating the conditioned air flow is entirely contained within the diffuser structure and is powered directly by the changes in room air temperature without auxiliary equipment or power systems.

The self contained diffuser is fully adaptable to existing systems to provide either or both modulated cooling and modulated heating and also to supply modulated cooling with the capability of morning warm-up.

The diffuser is constructed to direct the air flow from the periphery of the diffuser and into the room at an angle and with a velocity which causes the air flow to have preferred aerodynamic characteristics so as to hug the ceiling and to avoid dumping.

4 Claims, 10 Drawing Figures

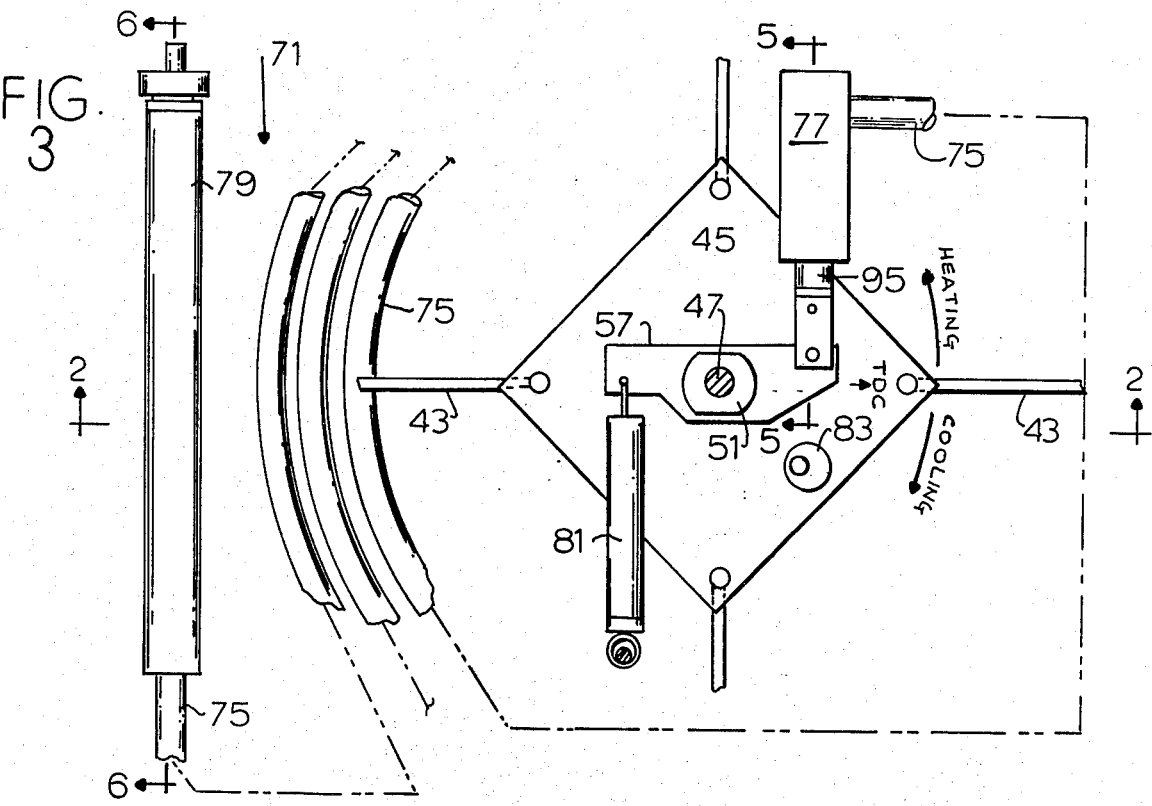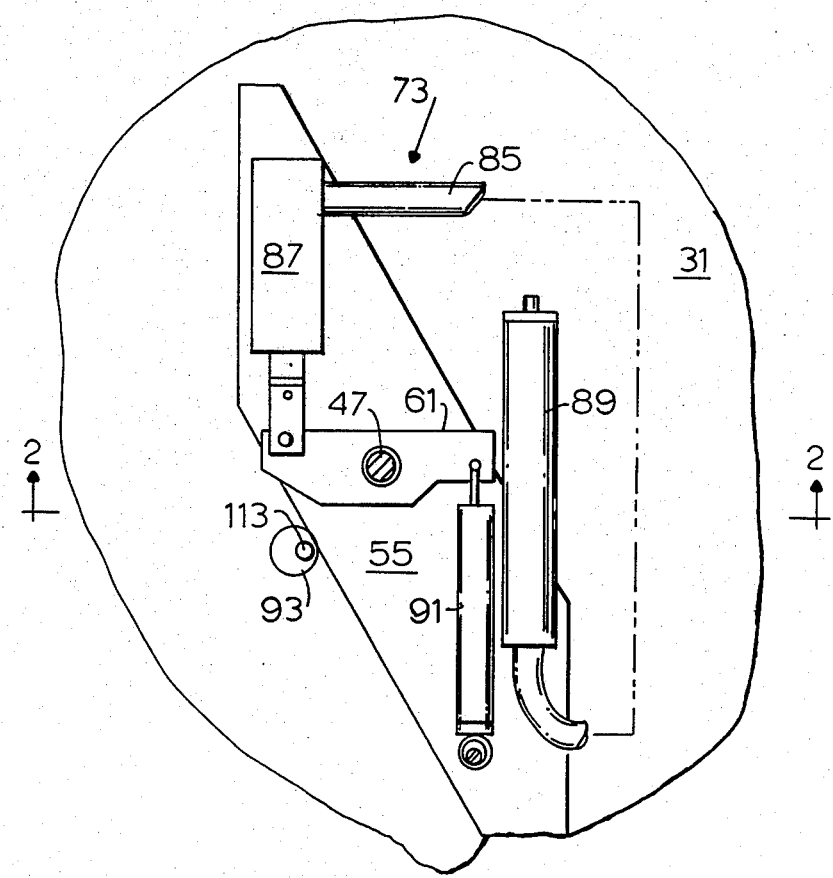

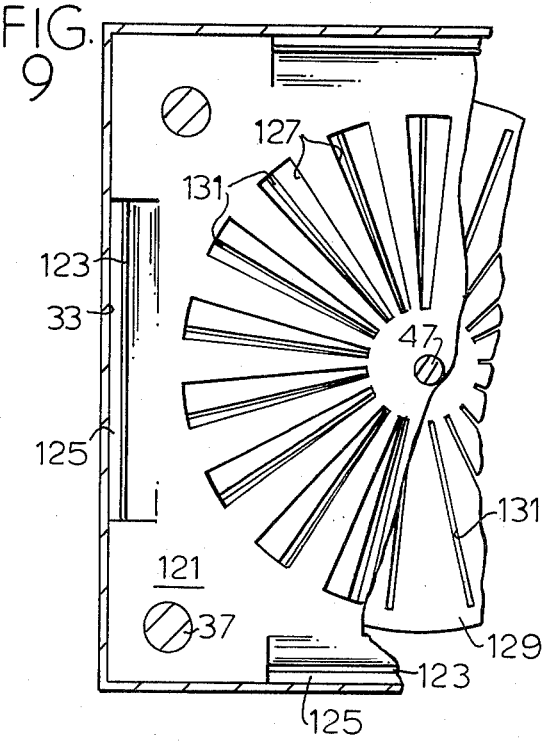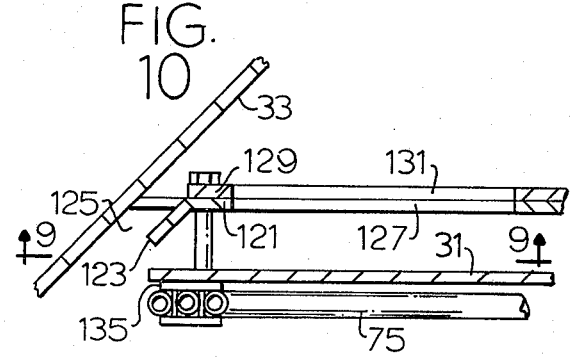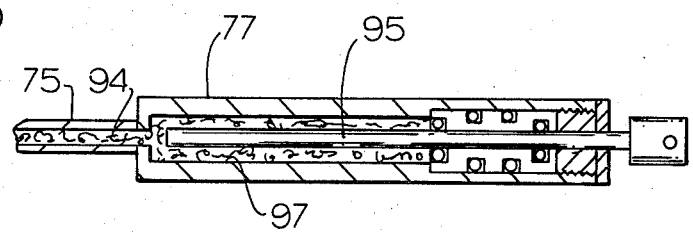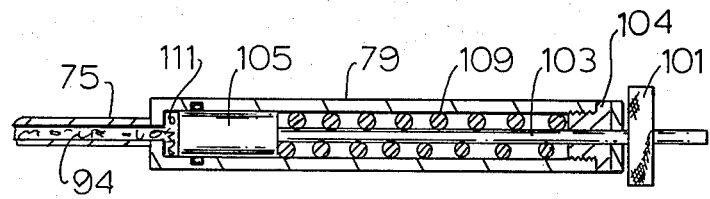

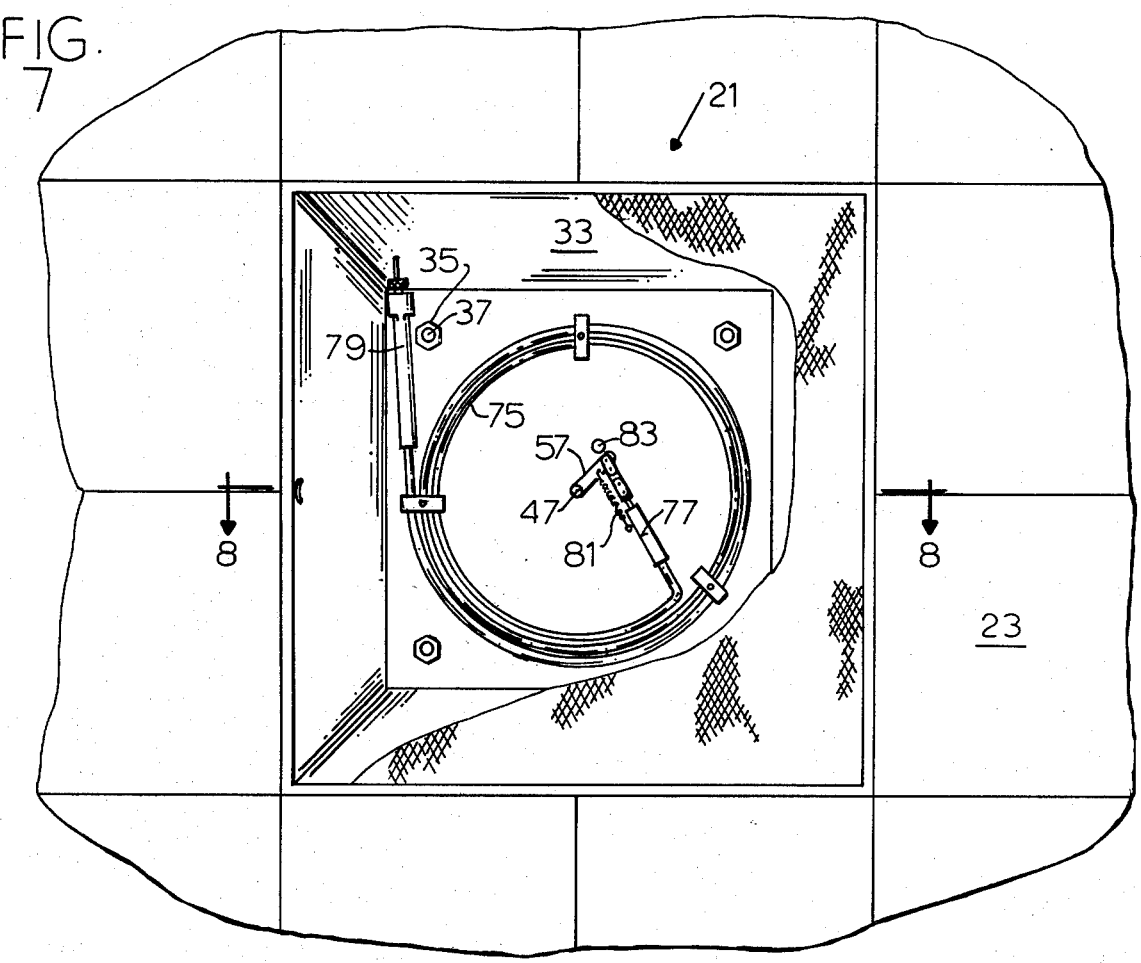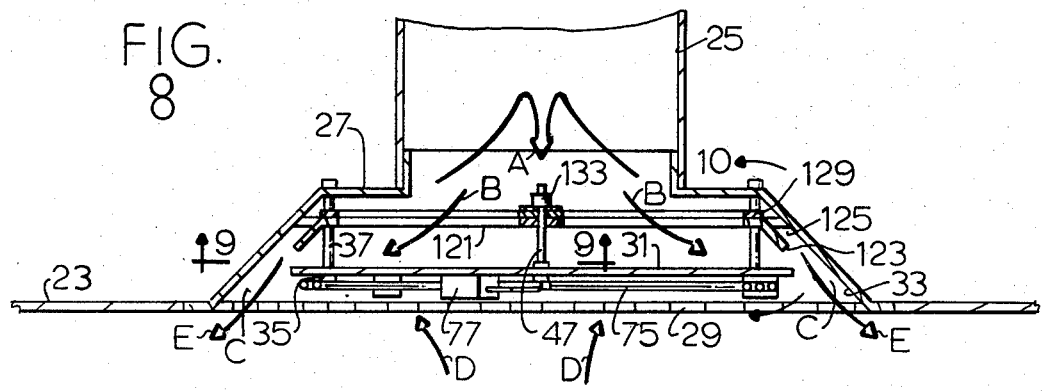

THERMALLY ACTUATED DIFFUSER

CROSS REFERENCE TO RELATED APPLICATION

Pending U.S. Application Ser. No. 862,812 filed Dec. 21, 1977 by Robert L. Vance (and assigned to the same assignee as the assignee of this application) discloses a thermally power actuator of the general kind disclosed in this application.

BACKGROUND OF THE INVENTION

This invention relates to a conditioned air system for buildings.

This invention further relates to a diffuser unit for a conditioned air system, and in particular to a ceiling mounted diffuser unit for a conditioned air system which delivers a modulated, variable volume of conditioned air to a room or other space in the building in response to changes in the temperature of the air in that room or other space which it conditions.

The invention also relates to an integrated sensor actuator which both senses temperature changes in the room and also provides the actuating force for varying the amount of air flow into the room in response to the sensed temperature. The integrated sensor actuator generates the actuating force for varying the volume of air flow without the use of any external or auxiliary systems or apparatus, (such as pneumatic air, duct pressure or electrical or hydraulic powered apparatus) for supplying the force necessary to vary the volume of air flow.

The invention also relates to a diffuser construction which directs the outflowing air from the diffuser into the room and along the adjacent ceiling surfaces at an efficient aerodynamic angle and velocity so as to cause the air to hug the ceiling and to minimize the problems of dumping of cold air in the parts of the room adjacent and below the diffuser.

The invention also relates to a diffuser which is constructed to operate on a low pressure differential to minimize noise and to conserve power and energy of the related conditioned air system.

Dumping of cold air from a ceiling mounted outlet for a ceiling mounted conditioned air system has been a problem in the prior art. If the cooling air does not leave the ceiling outlet with sufficient velocity or at the proper angle of flow, the result can be large temperature differentials between different areas and different levels in the room, and this can produce noticeable discomfort for the people in the room.

Most conditioned air distribution systems are set up to vary either the volume or the temperature of the conditioned air flow in response to a measurement of the temperature in the room. If the volume of the conditioned air flow is varied, the system is known as a variable air volume system (in the terminology of the art). Many current installations of conditioned air systems are using variable air volume systems (rather than constant volume, variable temperature systems) because the variable air volume system offers a number of potential operating and cost advantages.

The conventional practice in the prior art has been to modulate the volume flow of conditioned air in response to the air temperature in the room to which the conditioned air is supplied. In most such cases, a thermostat is used to sense the air temperature, and the thermostat is connected to an actuator system for positioning a damper in the branch duct supplying the conditioned air outlet device for the room. The temperature sensing mechanism is usually located in a position which is remote from the conditioned air outlet, and an auxiliary system or apparatus (such as an pneumatically powered actuator or an electrically powered or in some cases and hydraulicly powered actuator) is used to reposition the damper with changes in the room air temperature.

There are also actuating systems used in the prior art which are called self contained systems, but such systems are self contained in the sense only that they use the duct pressure to power and reposition the damper.

These prior art systems have presented a number of problems. They have been somewhat complex because of the need to interconnect the remotely located thermostat with the actuator apparatus. And the auxiliary actuator apparatus has in itself often contributed unfavorably to the complexity and size and cost of the system.

It is a primary object of the present invention to avoid and to overcome the problems of the prior art as described above.

It is a closely related object to construct an individually controlled, self contained, variable air volume diffuser which incorporates, as an integral part of the diffuser, a unitary sensor actuator that is directly powered by the temperature of the air in the room and that does not require any auxiliary actuator system or apparatus for varying the volume flow of conditioned air through the diffuser in response to changes in the sensed room air temperature.

SUMMARY OF THE INVENTION

The diffuser of the present invention, in one particular embodiment, comprises an outer can which has a rectangular shaped lower part and of a standard size and configuration so as to fit within a standard module of a modular ceiling. The upper part of the can has a circular configuration so as to fit within a branch duct of a conditioned air distribution system of a building. The can sidewalls are inclined at an outward angle for guiding the diffused air flow in the proper direction and with the desired flow velocity to cause the air flowing from the periphery of the diffuser to hug the ceiling and to avoid dumping.

The diffuser also includes a central diffuser plate which coacts with the sidewalls of the diffuser can to direct the conditioned air flow in the way described above.

All of the operating structure for modulating the volume flow of the conditioned air through the diffuser is mounted on and carried by the diffuser plate.

The diffuser plate and associated structure are quickly and easily installed and are removed from the diffuser can by four nuts which retain the diffuser plate on bolts or studs extending down from the diffuser can.

In one embodiment of the invention the structure which modulates the volume flow of conditioned air includes four louvers which are mounted by hinged connections in the edge portions of the diffuser plate. Each louver is moveable between a fully closed position (in which the outer edge of the louver engages the related inner surface of the sidewall of the can to block all flow through the diffuser) to a fully opened position (in which the louver swings downwardly to permit the maximum volume of conditioned air to flow through the diffuser). Each louver itself coacts with a related sidewall of the can to channel and to confine the conditioned air flow in the desired aerodynamic direction and with the desired velocity to maximize the Coanda effect so that the flow of conditioned air from the diffuser does hug the ceiling as described above.

Each vane is connected by a control rod to a louver control disc which is mounted for rotation with a shaft extending centrally through the diffuser plate. The control rods are linked to the louver control disc so that the louvers are fully closed at top dead center of each point of connection of a control rod to the control disc. As the control disc is rotated away from that top dead center position, and in either direction, the louver is progressively opened. Rotation of the control disc back toward top dead center position progressively returns the louver toward the fully closed position.

This association of the control disc, central shaft and louver control rods is used for modulated cooling when cooling air is supplied through the branch duct to the diffuser unit.

In this mode of operation the louvers can also be moved rapidly to a full open position (to permit the flow of warm air) by rotating the control disc past top dead center and through an arc on the side of top dead center opposite that used for modulated control of the cooling air flow. Rotating the control disc in this direction then permits the louvers to be subsequently moved toward a more closed position in response to an increase in room air temperature so as to then provide modulated heating.

The angular position of the control disc on the central shaft can also be varied to rotate the control disc far enough with respect to the central shaft to move the louvers to a full open position. The control disc is then reconnected to the central shaft so that the diffuser will act as a normally closed diffuser for modulation of warm conditioned air. A sensed increase in the room air temperature will then have the effect of moving the louvers toward a more closed position (rather than toward a more open position as is the case when cooling air is supplied through the diffuser).

This embodiment of the diffuser using louvers can therefore be installed and operated to provide four different modes of operation.

It can provide a fixed volume flow with the louvers set at a fixed angle.

It can provide modulated cooling of a cooling air flow in response to changes in room air temperature.

It can provide the modulated cooling with a capability of changing to a modulated heating mode.

It can also provide modulated heating by controlling the volume flow of warm air in response to changes in the room air temperature.

In another embodiment of the diffuser structure, the modulation of the conditioned air flow is produced by two relatively rotatable plates. Each plate has a number of radially extending and circumferentially spaced slots or openings. The extent to which the sets of slots in the two discs are aligned determines the amount of conditioned air which is permitted to flow through the plates and through the diffuser.

This embodiment of the invention provides the same four options or degrees of control as described above for the louver construction, depending upon the initial positioning of the two relatively rotatable plates. Thus, this embodiment can provide a fixed slot alignment for a pre-selected, constant volume of flow, or it can provide modulated cooling, or it can provide a modulated cooling with the capability of heating, or it can provide modulated heating.

The second embodiment can also preferably incorporate fixed opening peripheral slots which establish a minimum air flow stream along each peripheral outlet edge of the rectangular shaped diffuser. This minimum air flow stream is required for ventilation in some conditioned air installations. The diffuser of the present invention utilizes this minimum air flow stream to maximize the Coanda effect (described above) by entraining the modulated conditioned air flow (particularly at the relatively low volume flows of conditioned air) so that the relatively high velocity flow of the minimum air flow stream tends to hold up and to prevent undesired damping of the modulated flow of conditioned air.

The minimum air flow stream also entrains a certain amount of room air to induce upward flow of room air to contact with the room air temperature sensing structure of the diffuser mounted below the diffuser plate in the diffuser can.

The construction and mode of operation of both the embodiments of the diffuser of the present invention permit the diffuser to operate with relatively low pressure differentials. This has the advantage of substantially reducing turbulence and noise, and it has further advantages of being efficient so that power and cost of operation of the supply fan for the conditioned air system can be minimized.

It is an important feature of the present invention that the diffuser (in both embodiments described above) incorporates an integrated, sensor actuator for positioning the diffuser control structure to vary the volume flow of conditioned air through the diffuser in response to changes in room air temperature.

The sensor actuator is entirely self contained within the diffuser structure and is powered directly by the changes in the sensed room air temperature without auxiliary equipment or power systems.

In a specific embodiment of the present invention the sensor actuator comprises a coiled tube sensor filled with a temperature sensitive substance. Room air is induced to flow over the sensor so that increases and decreases in the room air temperature cause corresponding increases or decreases in the volume of the temperature sensitive substance. An increase in room air temperature causes an expansion of the temperature sensitive substance. The expansion pushes an actuator rod in a direction to rotate the central control shaft in the diffuser unit to cause a resulting repositioning of the louvers or rotary disc as described above. The contraction of the temperature sensitive substance (as occurs when the room air temperature decreases) permits a return spring to retract the actuator rod; and this moves the louvers or rotary disc in the opposite direction.

The sensor actuator is mounted beneath the diffuser plate of the diffuser in a floating mounting which isolates the sensor actuator from any heat transfer contact with the diffuser plate.

Diffuser apparatus and methods which incorporate the structure and technique described above and which are effective to function as described above constitute specific objects of this invention.

Other and further objects of the present invention will be apparent from the following description and claims and are illustrated in accompanying drawings which, by way of illustration, show preferred embodiments of the present invention and the principles thereof and what are not considered to be the best modes contemplated for applying these principles. Other embodiments of the invention embodying the same or equivalent principles may be used, and structural changes may be made as desired by those skilled in the art without departing from the present invention and the purview of the appended claims.

BRIEF DESCRIPTION OF THE DRAWINGS

In FIG. 1 part of the appearance plate has been partially broken away to show details of the diffuser plate, the louvers (or vanes), at the edges of the diffuser plate, the temperature sensor coil and related cooling actuator, the louver control disc, and the linkage rods extending from the louver control disc to the louvers.

FIG. 3 is a fragmentary plan view taken along the line and in the direction indicated by the arrows 3—3 in FIG. 2. FIG. 3 shows details of the cooling actuator and cooling actuator link arm in association with an outer sleeve which is connected to a heat actuator mounting plate shown in FIG. 4. FIG. 3 also illustrates, by the legends, the direction of rotation of the louver control disc in the cooling mode and in the heating mode.

FIG. 4 is a fragmentary plan view taken along the line and in the direction indicated by the arrow 4—4 in FIG. 2. FIG. 4 shows details of a heat actuator mounting plate, a heat sensor, a heat actuator, a heat actuator link arm, and the association of the link arm with a shaft connected to the louver control disc shown in FIG. 3.

FIG. 5 is an enlarged cross sectional view through the cooling actuator and is taken along the line and in the direction indicated by the arrows 5—5 in FIG. 3.

FIG. 6 is an enlarged cross sectional view through a temperature adjustment mechanism for adjusting the controlling temperature range of the room temperature sensor. FIG. 6 is taken along the line and in the direction indicated by the arrows 6—6 in FIG. 3. This mechanism also provides for overload capacity if the system is exposed to excessive temperatures.

FIG. 7 is a bottom plan view like FIG. 1 but showing another embodiment of the thermally actuated variable air volume diffuser constructed in accordance with the present invention. The embodiment of the invention shown in FIG. 7 incorporates a rotary and slotted plate construction for modulating the amount of air flow.

FIG. 8 is an elevation view taken along the line and in the direction indicated by the arrows 8—8 in FIG. 7. FIG. 8 also illustrates how the diffuser of the present invention (in both the illustrated FIG. 8 embodiment and in the FIGS. 1-4 embodiment) causes the diffused air flow to hug the ceiling while preventing dumping.

FIG. 9 is a fragmentary plan view taken along the line and in the direction indicated by the arrows 9—9 in FIG. 8.

FIG. 10 is a fragmentary elevation view in cross section and includes generally that part of the structure shown encircled by the arrows 10—10 in FIG. 8. FIG. 10 shows the slots in the two rotary discs aligned for permitting air flow through the aligned slots.

FIG. 10 also illustrates details of the floating mounting of the temperature sensor for isolating and insulating the sensor from the diffuser plate.

DESCRIPTION OF THE PREFERRED EMBODIMENTS

Figure 1:
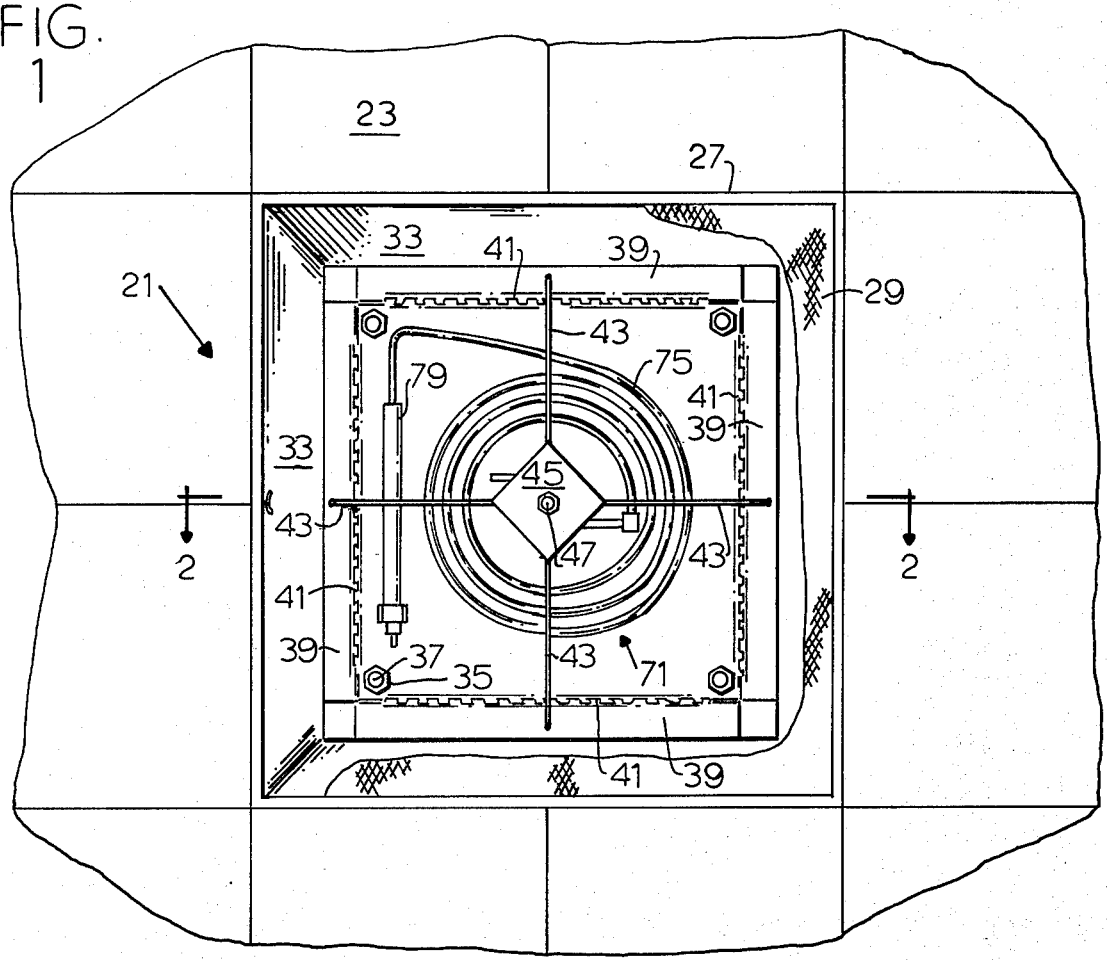
FIG. 1 is the bottom plan view of a part of a modular ceiling showing a thermally actuated variable air column diffuser constructed in accordance with one embodiment of the present invention and installed in one of the rectangular modules of the modular ceiling.

A thermally actuated, variable air volume diffuser constructed in accordance with one embodiment of the present invention is indicated generally by the reference numeral 21 in FIG. 1.

FIG. 1 is a bottom plan view looking upwardly at a room ceiling.

The ceiling, as illustrated in FIG. 1, is a modular ceiling comprising a number of individual modules 23. The diffuser 21 of the present invention is installed in the ceiling in the place of one of the modules 23.

The diffuser 21 distributes a variable volume of air to the room, or other space, from a branch duct, and the amount of air flowing through the diffuser 21 is modulated in response to changes in the air temperature in the room, as will be described in detail below.

Figure 2:
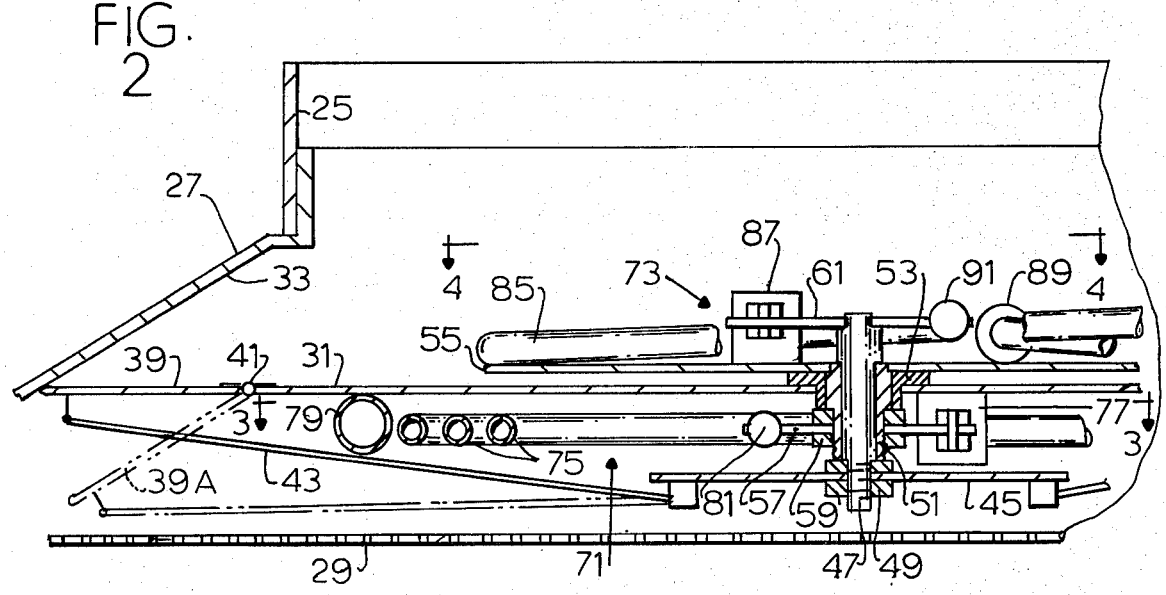
FIG. 2 is a side elevation view taken along the line and in the direction indicated by the arrows 2—2 in FIG. 1 and in FIGS. 3 and 4.

The branch duct is shown in FIG. 2 and is indicated by the reference numeral 25. This branch duct 25 is in turn connected to a main supply duct (not illustrated).

A supply fan is controlled to maintain a required pressure within the main duct system as, for example, by means of a conventional control system which senses the static pressure in the main duct system and increases or decreases the fan volume to maintain the static pressure within the control range. Each branch duct 25 may have its capacity controlled at the major points of distribution to maintain the required pressure at the diffuser 21, again by conventional and well known apparatus and techniques.

It is an important feature of the present invention, as will be described in more detail below, that the diffuser 21 operates at a relatively low pressure differential. This has the benefit of being energy and cost efficient, and it has the further benefit of minimizing the noise produced by air flow through the diffuser.

As illustrated in FIGS. 1 and 2, the diffuser 21 comprises a diffuser can 27, an appearance plate 29, and a diffuser plate 31.

The diffuser plate serves both as a plate for directing the air flow and as a support structure for the operative components of the diffuser.

FIG. 8 shows how air (see arrow A) flowing from the branch duct 25 is deflected (see arrows B) by the diffuser plate 31 outwardly to the periphery of the diffuser can 27 for subsequent flow (see arrow C) down along the inner surfaces 33 of the related, inclined sidewalls of the can 27.

As will be described in greater detail below, this diffuser plate directed air flow induces a certain amount of room air (see arrows D) up through the appearance plate 29. This induced room air flows over a sensor actuator assembly 71 described below and is mixed with the conditioned air and distributed from the four peripheral edges of the lower end of the can 27 (as indicated by the direction arrows E in FIG. 8). The air leaving the periphery of the diffuser 21 is directed at an angle with respect to the adjacent ceiling panels 23 so as to provide a maximum Coanda effect and to thereby cause the diffused air to hug the ceiling and to avoid dumping.

This mode of operation of the diffuser plate 31 and related diffuser structure is produced by both the FIG. 1 and the FIG. 7 embodiments of the present invention and will be described in more detail below with specific reference to the FIG. 7 embodiment.

The other function of the diffuser plate 31 (the function of serving as a support for the operative components of the diffuser 21) will now be described.

As best illustrated in FIGS. 1 and 7, the diffuser plate is removable attached to the can 27 by four nuts 35 and corresponding bolts 37.

In the FIG. 1 embodiment four louvers or vanes 39 are connected by hinges 41 to the plate 31, and each louver 39 is moveable from a fully closed position (in which the outer edge of the louver engages the inside surface 33 as illustrated in FIG. 2) to a fully open position (as illustrated in FIG. 2) to a fully open position (as illustrated by the reference numeral 39A in FIG. 2).

The control of the movement of each louver 39 between the fully closed position and the fully open position and all intermediate positions is produced by a rod 43 and a louver control disc 45.

The louver control disc 45 is in turn connected to a shaft 47 by a locking nut 49 for rotation with the shaft 47.

As will be described in greater detail below, the locking nut 49 can be loosened, and the angle at which the plate 45 is connected to the shaft 47 can be varied to provide for either modulated cooling (when cooling air is supplied through the branch duct) or to provide modulated heating (when warm air is supplied through the branch duct).

With continued reference to FIG. 2, the shaft 47 is mounted within a sleeve 51. Under certain conditions of operation the shaft 47 and sleeve 51 are rotated together and in unison. Under other conditions of operation, such as during morning warm-up as described in more detail below, a limited amount of relative rotation between the shaft 47 and the sleeve 51 occurs.

The sleeve 51 is in turn mounted for rotation within the diffuser plate 31 by a bushing or bearing 53.

A heat actuator mounting plate 55 is connected to the upper end of the sleeve 51 (as illustrated in FIG. 2).

A cooling actuator link arm 57 is connected to the mid part of the sleeve 51 by a locking nut 59.

The connections between the sleeve 51, the heat actuator mounting plate 55 and the cooling actuator link arm 57 are such that these three elements always move together as a rigid assembly.

A heat actuator linked arm 61 is connected to the upper end of the shaft 47 as illustrated in FIG. 2. This is a rigid connection so that the heat actuator link arm 61, shaft 47 and louver control disc 45 always move as an integrated assembly.

As illustrated in FIG. 3, when the diffuser 21 is set up to provide a modulated cooling mode of operation, the louver control disc 45 is rotated from the normally closed position and in a clockwise direction (as indicated by the legend "cooling" in FIG. 3 to produce progressively greater cooling air flow) by progressively retracting the vanes 39 from the normally fully closed position to the maximum open position 39A shown in FIG. 2. With the particular embodiment illustrated in FIGS. 1–4, this movement to full open from full closed is produced by about 30° of rotation of the louver control disc 45 as illustrated in FIG. 3.

In this modulated cooling mode of operation the louvers 39 can also be quickly and fully opened from a normally closed position (or any other modulated cooling position) to permit the heating air to be supplied through the diffuser 21 during a heating condition of operation. The louver control disc 45 is rotated counter clockwise (as indicated by the legend "heating" in FIG. 3) to provide this opening of the louvers for a morning warm-up mode of operation.

Furthermore, and as will be described in greater detail below, the locking nut 49 can be loosened and the relative angular position of the louver control disc 45 with respect to the shaft 47 can be changed (again by approximately 30°) to rotate the louver control disc 45 counter clockwise (as viewed in FIG. 3) with respect to the shaft 47 to an extent sufficient to move the louvers 37 to a normally full open position 39A. The locking nut 49 is then tightened to hold the louver control disc 45 in this adjusted position and the diffuser 21 will then provide modulated heating as warm air is supplied through the branch duct 25 in response to changes in the sensed air temperature in the room. That is, the vanes 37 will be moved, in a modulated way, from a normally full open position to a full closed position as the room air temperature is increased to a certain level.

With the diffuser 21 set up as illustrated in FIGS. 2 and 3 to provide modulated cooling with cooling air supplied through the branched duct 25, the movement of the louvers 39 and louver control disc 45 from the normally fully closed position to modulated open positions (within the arc marked "cooling" in FIG. 3) is produced by a room air temperature sensor actuator assembly indicated generally by the reference numeral 71 in FIGS. 1, 2, and 3. The assembly 71 is mounted in a floating mounting below the diffuser plate 31 to isolate the assembly from heat transfer contact with the diffuser plate.

The rotation of the louver control disc to the other side of top dead center (and through the arc marked "heating" in FIG. 3) is provided by a duct heating air temperature sensor actuator assembly indicated generally by the reference numeral 73 in FIG. 4. This movement of the disc 45 moves the louvers 39 from a normally fully closed position to a full open position, in a rapid and coarse or unmodulated way, to provide the capability of morning warm-up with hot air in the duct.

Looking first at the construction of the room air temperature sensor actuator assembly 71 in FIG. 3, the assembly 71 comprises a coiled tube sensor 75, an actuator 77, a temperature range adjustment mechanism 79, a return spring 81, the cooling actuator link arm 57, a stop 83, and an overload capacity or chamber 107.

The duct heating temperature sensor actuator assembly 73 is similar to the room air temperature sensor actuator assembly in the make up of its component parts. Thus, the assembly 73 (as illustrated in FIG. 4) comprises a coiled tube sensor 85, an actuator 87, a temperature range adjustment mechanism 89, a return spring 91, the heat actuator link arm 61, a stop 93, and an overload capacity chamber.

It is an important feature of the present invention that room air temperature sensor actuator assembly 71 is a self contained, integrated, sensor actuator that both senses changes in the room air temperature and (at the same time and using the sensed room air temperature change as the power source) modulates the volume of the conditioned air flow (by repositioning the louvers 39 in response to the changes in room air temperature) to provide the room or other space with the cooling (or warm) air flow that is required to return the room air temperature to the set point.

As best shown in FIGS. 5 and 6, the sensor tube coil 75 contains a temperature sensitive substance which expands or contracts with increasing or decreasing room air temperatures. As the room air is induced to flow upward (as indicated by the arrows D in FIG. 8) and into contact with the outer surface of the coiled tube sensor 75, the temperature sensitive substance 93 within the tube is heated or cooled or maintained, as the case may be, to or at the temperature of the room air so that this substance 93 continuously senses the room air temperature and any changes in the room air temperature.

If the room air temperature is increasing, the substance 93 will expand, and this expansion forces an actuator rod 95 outwardly (to the right as viewed in FIG. 5) of an inner cylinder 97 of the actuator 77. This outward movement of the actuator rod 95 rotates the link 57 (see FIG. 3) in a clockwise direction against the bias of the return spring 81.

The sleeve 51 rotates with the link 57, and the heat actuator mounting plate 55 also rotates with the interconnected sleeve 51 and link 57.

Looking at FIG. 4, when the conditioned air flowing through the branch duct 25 is cooling air, the actuator rod 89 of the heat actuator 87 is fully retracted within the actuator 87 and is maintained in that position by the bias or force of the return spring 91. As a result, rotation of the heat actuator mounting plate 55, as will be described below, causes the entire duct heating air temperature sensor actuator assembly 73 to rotate in unison with rotation of the cooling actuator link arm 57. The rotation of the heat actuator link arm 61 therefore causes the interconnected shaft 47 to rotate in unison with the sleeve 51; and the louver control disc 45 is thus rotated directly by, and in the same direction, and to the same extent, as the rotation of the cooling actuator link arm 57 in this mode of operation.

The temperature operating range can be adjusted by the mechanism 79. This mechanism 79 includes a temperature adjusting knob 101 which is threaded on an end of a temperature adjusting rod 103. The rod 103 is in turn connected to a plug piston 105 which is spring biased inwardly within a cylinder 107 of the mechanism 79 by a compression spring 109. Turning the knob 101 in the direction to move the rod 103 outwardly of the cylinder 107 increases the volume within a chamber 111. Adjustment of the knob in this direction therefore requires the material 93 to expand to a greater degree before any resulting movement is produced on the actuator rod 95 of the actuator. In a modulated cooling mode of operation this adjustment raises the temperature operating range. Adjustment of the nut 101 in the opposite direction lowers the temperature operating range.

The mechanism 79 also provides overload protection. The compression spring 109 is preloaded on assembly to a load which is in excess of any loads exerted by the return spring 81 over the normal operating range of the diffuser. The rod 103 can shift axially through a spring retainer nut 104 to accomodate expansion of the chamber volume 107 increase resulting from any condition (thermal or mechanical).

The internal construction of the actuator 87 is the same as that of the actuator 77 shown in FIG. 5, and the internal construction of the temperature adjusting mechanism 89 is the same as that of the temperature adjusting mechanism 79 shown in FIG. 6.

The same temperature sensing substance is used in the coiled tube sensor 85 as in the coiled tube sensor 75.

The preferred material for the temperature sensing substance 93 is a material that has a high coefficient of thermal expansion and a low degree of compressibility. The material should also be sufficiently soft to permit a moderate size return spring to build up enough force to return the actuator rod within the cylinder 97 as the sensed temperature decreases and the material 93 contracts. One particular composition that has been found satisfactory is a medium weight grease with a high parafin content. It is a product which is normally used primarily as a preservative (to prevent rust or corrosion) and also as a lubricant. The temperature sensitive substance 93 is preferably a grease with about a 60% by volume parafin content. This composition minimizes problems of entrainment of air in the course of filling the assembly 71, and it contains enough solid so that the build modulus is high and there is almost no compressibility.

With reference now to FIG. 4, the duct heating air temperature sensor actuator assembly 73 is connected to the shaft 47 to cause rotation (upon actuation of the actuator 87) in a direction counter to the direction of rotation of the shaft 47 produced by the sensing of the warmer air in the room by the sensor actuator assembly 71. That is, an increasing air temperature in the room (as sensed by the sensor actuator assembly 71) rotates the shaft 47 in a direction to open the louvers 39 to let more cooling air flow from the diffuser 21; but the sensing of hot air within the branch duct 25 by the sensor actuator assembly 73 rotates the shaft 47 and louver control disc 45 in the opposite direction (counter clockwise and through top dead center as viewed in FIG. 3) and through the arc marked "Heating" until the heat actuator link arm 61 engaged the stop 93. This causes a coarse and rapid movement of the louvers 39 toward a full open position because the temperature differential sensed by the sensor actuator assembly 73 is so large when warm-up air is blown into the duct 25.

This mode of operation is often desired for a morning warm-up to bring the room up to the desired temperature after the air temperature in the room has been permitted to fall substantially below the desired temperature, such as during a weekend when the room is not being used. In this condition of operation, and assuming the actuator 77 senses a room air temperature below that at which any cooling air flow is required (because there is no lighting or people to raise the room temperature), the actuator 77 moves the louvers 39 to the full closed position.

When hot air is then blown through the branch duct 25 for a limited period of time, usually about half an hour, just shortly before the start of normal working hours on a Monday morning, the heat actuator 87 in response to the sensed high temperature of the hot air (for example, 110° F.) in the branch duct rotates the link arm 61 counter clockwise with respect to the stationary heat actuator mounting plate 55 to move the louvers 39 to the full open position and to permit the maximum amount of warming air to flow into the cold room to quickly bring the room air temperature up to the desired range (say 50° to 72° F.).

If the room air temperature increases to the point where the temperature gets into the controlling range of the sensor actuator 71, then the sensor actuator 71 thereafter provides modulated heating by moving the louvers to a more closed position with increasing room air temperature.

However, if the sensor actuator 71 has initially positioned the louvers in a partially opened position (rather than in a fully closed position, as described above) at the time warm was supplied to the diffuser, then the sensor actuator 73 moves the disc 45 in a direction to close the louvers (at TDC) and then to reopen the louvers to a partially open position.

After a timed interval the flow of hot air is discontinued and cooling air is again introduced into the branch duct. This causes the sensor actuator assembly 73 to retract the rod 89 fully within the actuator 87, and this in turn swings the louver control disc 45 back to the position where the louvers 39 are modulated in the cooling range and under the control of the room air temperature sensor actuator assembly 71.

The stop 93 is an eccentric mounted stop so that the effective stop position of the piston rod can be varied by loosening a retainer screw 113, and rotating the stop 93 to the desired position and then retightening the retainer screw 113. This is a factory setting which is not normally changed in the field.

The stop 83 is also an eccentric mounted stop like the stop 93.

As noted above, the room air temperature sensor actuator 71 can be used to provide modulated heating with warming air supplied through the branch duct 25, and this is accomplished by loosening the lock nut 49, rotating the louver control disc 45 sufficiently far (about 30° as illustrated in FIG. 3) to move the louvers 39 from the normally full closed position to a normally full open position 39A with the actuator rod 95 fully retracted within the actuator 77. The locking nut 49 is then turned down to lock the louver control disc 45 on the shaft 47 at this position, and the sensor actuator assembly 71 then operates in a mode of operation which modulates from normally full open to a full closed on the sensing of increasing temperatures within the selected range in the room air.

The FIGS. 1–4 embodiment as described above provides full flexibility of modulated cooling, modulated cooling with morning warm-up and modulated heating.

For some applications no modulated heating or cooling is required, and in this case, the louvers 39 are set at a fixed angle in a field installation and the diffuser plate 31 is installed in the can 27 without either the sensor actuator assembly 71 or the sensor actuator assembly 73.

If it is subsequently desired to provide modulated cooling, then this can easily and quickly be done by removing just the four nuts 35, removing the installed diffuser plate 31, replacing it with a diffuser plate having the room air temperature sensor actuator assembly 71, and, if desired, also having the duct air temperature sensor actuator assembly 73 for providing either just modulated conditioned air control or modulated conditioned air control with the feature of override for morning warm-up.

A thermally actuated variable air volume diffuser constructed in accordance with another embodiment of the present invention is illustrated in FIGS. 7–10. The parts of this embodiment of the diffuser which correspond to like parts in the embodiment of the diffuser shown in FIGS. 1–6 and described above are indicated by like reference numerals.

The diffuser 21 shown in FIG. 7 is, like the diffuser 21 shown in FIG. 1, constructed to have a standard 24 inch by 24 inch rectangular configuration at the lower end of the can 27 so that the diffuser will fit directly in the place of a standard ceiling module having these dimensions.

This rectangular configuration also produces the effect of four individual 24 inch linear diffuser units (in view of the fact that the diffuser of the present invention directs the air outwardly along each peripheral edge at relatively high velocity).

In certain conditioned air installations there are minimum ventilation requirements, and the embodiment of the diffuser 21 shown in the FIGS. 7–10 is especially well suited for such conditioned air application because it actually embodies two diffusers in one casing—a minimum, fixed flow volume diffuser and a variable flow volume diffuser.

The diffuser 21 as shown in FIGS. 8 and 9 incorporates a first control plate 121 which extends across the entire inner area of the can 27 between the inner surfaces 33 of the outwardly flared sidewalls of the can. The control plate 121 has four downwardly turned flanges 123. Each flange 123 coacts with the related inner surface 33 to define a channel or slot 125. The slots 125 provide a primary air path which permits a minimum air volume of relatively high velocity air to be continuously diffused along the perimeter of the diffuser 21.

The control plate 121 also has a number or radially extending and circumferentially spaced apart slots 127. As illustrated in FIG. 8 the variable air volume flow (see the arrow C) must pass through these control slots 127.

The amount of conditioned air which is permitted to pass through the slots 127 is regulated by a second control plate 129 having radially extending and circumferentially spaced apart slots 131 which can be brought into full registery with the slots 127 or which can be rotated into positions in which the slots 127 are partially or completely blocked off.

The second control plate 129 is connected to the shaft 47 by a locking nut 133 (see FIG. 8) so that the plate 129 rotates in unison with rotation of the shaft 47. The shaft 47 is in turn rotated in response to the torque exerted by the link 57 (see FIG. 7) under the control of the room air temperature sensing actuator 77 and the return spring 81.

The operation of these components in FIG. 7 is substantially the same as the operation of the correspondingly numbered components shown in FIG. 3 and described above, except for the fact that in the FIG. 7 embodiment a duct heating air temperature sensing actuator assembly (like that shown in FIG. 4) has not been illustrated as incorporated in the FIGS. 7–10 embodiment. However, such a duct heating air temperature sensor actuator assembly and related structure can be added to the diffuser shown in FIGS. 7–10 in the same way that it has been illustrated and described as incorporated in the diffuser illustrated in FIGS. 1–6.

Also, the angular orientation of the second control plate 129 with respect to the shaft 47 (and with respect to the first control plate 121) can be varied to change the mode of operation from a normally closed-modulated opening positioning of the slots 127 and 131 (in the cooling mode) to a normally open modulated closing positioning of the slots 127 and 131 (in a heating mode).

The shift of operations from one mode to the opposite mode (that is, the shift from going normally closed to normally open as one mode and shifting from that to the other mode which is going from normally open to closed) is dependent upon the geometrical arrangement of having the second control plate 129 set with edges of the slots 127 and 131 aligned in what is in effect a top dead center alignment with the slots 127 fully closed by spaces between the slots 131. This mode of operation of the second control disc 129 is essentially the same as the positioning of the louver control disc 45 at the top dead center position with the louvers 39 fully closed in the FIG. 1–4 embodiment as described above.

Assuming the second control plate 129 is positioned and clamped by the locking nut 133 to go from normally closed to open in a cooling mode when cooling air is supplied through the branch duct 25, a sensing of an increasing air temperature in the room will cause the cooling actuator 77 to rotate the second control disc 129 in a direction to increase the amount of registry between the slots 127 and 131 to permit a greater volume of cooling air to flow through the slots 127.

When the modulated air volume flowing through the slots 127 is relatively low, the relatively high velocity of the minimum air flow through the slots 125 helps to insure that the desired clinging effect is provided in the mixture of the two air flows leaving the diffuser unit.

It should be noted that in the FIGS. 1–4 embodiment when the louvers 39 start to open a relatively high velocity energy is produced right away in the conditioned air flow to keep the air up, regardless of the volume.

In the FIGS. 7–10 embodiment the relatively high velocity of the minimum air flow produces another beneficial effect because it maintains the induction effect illustrated by the arrows D in FIG. 8. The same energy that causes the diffused air flow to cling to the ceiling and to prevent dumping also assures that there is enough energy produced for the induction needed for proper sensing of the room air temperature.

As best illustrated in FIG. 10 the coiled sensor tube 75 is held suspended beneath the diffuser plate 31 by a floating mounting 135 which permits the induced room air to flow over and around all surfaces of the tube sensor 75 and which also isolates and insulates the tube sensor 75 from any heat transfer contact with the diffuser plate 31.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. A diffuser of a kind used to regulate the volume flow of conditioned air from a duct to a room or other space comprising,
   (a) flow control means for varying the size of an opening in the diffuser to regulate the volume flow of conditioned air from the duct through the diffuser and to the room or other space, and
   (b) sensor actuator means operatively associated with the flow control means and responsive to both room air temperature and to duct air temperature for
      (1) modulating the flow control means in a normally closed to open mode of operation in response to changes in room air temperature when cooling air is supplied through the duct, and
      (2) modulating the flow control means in a normally opened to close mode of operation when warm air is supplied through the duct
   said sensor actuator means including a first sensor actuator positioned to sense only room air temperature and a second sensor actuator positioned to sense only duct air temperature,
   said flow control means including a rotatable control element, and
   wherein the first sensor actuator is connected to rotate the control element in one direction in response to increasing room air temperature and the second sensor actuator is connected to rotate the control element in an opposite direction in response to increasing duct air temperatures.

2. A diffuser of a kind used to regulate the volume flow of conditioned air from a duct to a room or other space and comprising,
   flow control means for varying the size of an opening in the diffuser to regulate the volume flow of conditioned air from the duct through the diffuser and to the room or other space,
   first sensor actuator means responsive to room air temperature and operatively associated with the flow control means for modulating the flow control means in a normally closed to open mode of operation in response to changes in room air temperature when cooling air is supplied through the duct,
   second sensor actuator means responsive to duct air temperature and operatively associated with the flow control means for moving the flow control means to a full open position in response to the sensing of warm air in the duct,
   a fixed diffuser plate,
   said flow control means including a sleeve mounted for rotation in the fixed diffuser plate and a shaft mounted for rotation within the sleeve, and
   wherein the first sensor actuator means are connected to rotate the sleeve and the second sensor actuator means are connected to rotate the shaft.

3. A diffuser for circulating conditioned air into a room from a ceiling location within the room and comprising,
   an outer can defining an air flow path,
   said can having an air discharging outlet,
   flow directing means located within the can and having a configuration to cause the air flow to be directed laterally outwardly from the air discharge outlet at a narrow angle with respect to the adjacent ceiling,
   volume flow regulating means mounted in the can and movable to vary the volume flow of conditioned air through the diffuser,
   a diffuser plate located in the can for receiving circulated room air along the underside of the diffuser plate and having an upperside which causes all the conditioned air to flow through the air discharge outlet,
   sensor actuator means mounted on the underside of the diffuser plate and effective both to sense changes in the room air temperature and to actuate the movable volume flow regulating means directly from power produced by a change in the sensed room air temperature,
   and wherein the volume flow regulating means are operatively associated with the flow directing means to maintain sufficient velocity energy in the air flow through the air discharge outlet that the air flow hugs the ceiling and avoids dumping at all volumes of flow through the diffuser, and wherein the diffuser plate is a rectangular plate, said flow directing means include a vane extending along each edge of the diffuser plate and connected to the diffuser plate by a hinge connection so as to permit swinging movement of the vane about the hinge connection and toward and away from an inner, adjacent surface of the can to vary the volume flow with changes in angular position of the vane and wherein the volume flow regulating means include a rotatable control element mounted for rotation on the diffuser plate by the sensor actuator means and having linkages connecting the rotatable control element with each of the vanes for repositioning the vanes with rotation of the control element by the sensor actuator means.

4. A diffuser for circulating conditioned air into a room from a ceiling location within the room and comprising, an outer can defining an air flow path, said can having an air discharge outlet, flow directing means located within the can and having a configuration to cause the air flow to be directed laterally outwardly from the air discharge outlet at a narrow angle with respect to the adjacent ceiling, volume flow regulating means mounted in the can and movable to vary the volume flow of conditioned air through the diffuser, a diffuser plate located in the can for receiving circulated room air along the underside of the diffuser plate and having an upperside which causes all the conditioned air to flow through the air discharge outlet, sensor actuator means mounted on the underside of the diffuser plate and effective both to sense changes in the room air temperature and to actuate the movable volume flow regulating means directly from power produced by a change in the sensed room air temperature, and wherein the volume flow regulating means are operatively associated with the flow directing means to maintain sufficient velocity energy in the air flow through the air discharge outlet that the air flow hugs the ceiling and avoids dumping at all volumes of flow through the diffuser, and wherein the volume flow regulating means include a first, fixed plate having a plurality of openings for permitting flow of conditioned air through the openings and a second, control plate connected for rotation by the sensor actuator means and effective to progressively cover and uncover the openings in the first plate from full open to full closed as the second, control plate is rotated by the sensor actuator means.

* * * * *